(12) United States Patent
Klosinski et al.

(10) Patent No.: US 11,365,677 B2
(45) Date of Patent: Jun. 21, 2022

(54) COMBINED CYCLE POWER PLANT AND METHODS OF CONTROLLING EMISSIONS THEREFROM

(71) Applicant: General Electric Company, Schenectady, NY (US)

(72) Inventors: Joseph Klosinski, Kennesaw, GA (US); Sanji Ekanayake, Mableton, GA (US); Alston Ilford Scipio, Mableton, GA (US); George Vargese Mathai, Atlanta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 294 days.

(21) Appl. No.: 16/829,731

(22) Filed: Mar. 25, 2020

(65) Prior Publication Data

US 2021/0301686 A1 Sep. 30, 2021

(51) Int. Cl.
| | |
|---|---|
| *F02C 6/18* | (2006.01) |
| *F02C 9/18* | (2006.01) |
| *F02C 9/28* | (2006.01) |
| *F23R 3/40* | (2006.01) |
| *F01K 23/10* | (2006.01) |

(52) U.S. Cl.
CPC ............... *F02C 6/18* (2013.01); *F01K 23/10* (2013.01); *F02C 9/18* (2013.01); *F02C 9/28* (2013.01); *F23R 3/40* (2013.01)

(58) Field of Classification Search
CPC ...... F02C 6/00; F02C 6/18; F02C 3/13; F02C 9/18; F02C 9/28; F23R 3/40; F01K 23/10
See application file for complete search history.

(56) References Cited

U.S. PATENT DOCUMENTS

| | | | |
|---|---|---|---|
| 4,907,406 A | 3/1990 | Kirikami et al. | |
| 5,473,898 A | 12/1995 | Briesch | |
| 6,095,793 A | 8/2000 | Greeb | |
| 10,138,815 B2 * | 11/2018 | Huntington | ............... F23L 7/00 |
| 2004/0160061 A1 | 8/2004 | Rouse et al. | |
| 2006/0016195 A1 | 1/2006 | Dalla Betta et al. | |
| 2010/0175366 A1 | 7/2010 | Nattanmai et al. | |

(Continued)

FOREIGN PATENT DOCUMENTS

| | | | | |
|---|---|---|---|---|
| EP | 3885541 A2 * | 9/2021 | ............. | F01K 23/10 |
| JP | S61104107 A | 5/1986 | | |
| JP | H04342805 A | 11/1992 | | |

OTHER PUBLICATIONS

Extended European Search Report for Patent Application EP 21161375.7 dated Oct. 4, 2021; 5 pp.

*Primary Examiner* — William H Rodriguez
(74) *Attorney, Agent, or Firm* — Armstrong Teasdale LLP

(57) ABSTRACT

A combined cycle power plant that includes a first gas turbine engine including a first turbine section, a second gas turbine engine including a second turbine section having an aft outlet configured to discharge an exhaust gas stream, an emissions reduction system configured to receive the exhaust gas stream discharged from the second gas turbine engine, and configured to remove oxides of nitrogen from the exhaust gas stream, and an interstage extraction system communicatively coupled with the first turbine section. The interstage extraction system is configured to selectively extract turbine extraction air from the first turbine section for providing heat to the emissions reduction system.

20 Claims, 2 Drawing Sheets

(56) References Cited

U.S. PATENT DOCUMENTS

| | | | |
|---|---|---|---|
| 2016/0123190 A1* | 5/2016 | Klosinski | F02C 6/04 |
| | | | 60/39.182 |
| 2016/0131046 A1 | 5/2016 | Leone et al. | |
| 2017/0167304 A1* | 6/2017 | Scipio | F01K 17/025 |
| 2017/0167305 A1* | 6/2017 | Scipio | F01K 23/10 |
| 2017/0167306 A1* | 6/2017 | Scipio | F02C 7/141 |
| 2017/0167307 A1* | 6/2017 | Scipio | F02C 6/18 |
| 2017/0167374 A1* | 6/2017 | Klosinski | F02C 6/04 |
| 2017/0167376 A1* | 6/2017 | Klosinski | F02C 6/18 |
| 2017/0167377 A1* | 6/2017 | Klosinski | F02C 6/06 |
| 2017/0167378 A1* | 6/2017 | Klosinski | F02C 3/04 |
| 2017/0167379 A1* | 6/2017 | Scipio | F02C 6/08 |
| 2017/0167380 A1* | 6/2017 | Klosinski | F02C 7/141 |
| 2017/0342900 A1* | 11/2017 | Scipio | F02C 6/18 |
| 2017/0342901 A1* | 11/2017 | Scipio | F02C 7/08 |
| 2017/0342902 A1* | 11/2017 | Scipio | F02C 9/18 |
| 2017/0342903 A1* | 11/2017 | Scipio | F02C 9/18 |
| 2018/0080347 A1 | 3/2018 | Yanosik et al. | |
| 2018/0216497 A1* | 8/2018 | Klosinski | F01K 23/101 |
| 2018/0216499 A1* | 8/2018 | Mathai | F02C 6/18 |
| 2019/0226374 A1 | 7/2019 | Mathai et al. | |

* cited by examiner

COMBINED CYCLE POWER PLANT AND METHODS OF CONTROLLING EMISSIONS THEREFROM

BACKGROUND

The present disclosure relates generally to selective catalytic reduction systems and, more specifically, to systems and methods of heating a reduction catalyst for use in a power plant.

Rotary machines, such as gas turbines, are often used to generate power for electric generators. At least some known gas turbines have a gas path that includes, in serial-flow relationship, an air intake, a compressor, a combustor, a turbine, and a gas outlet. Compressor and turbine sections include a plurality of rows of circumferentially-spaced rotating buckets or blades coupled within a housing. At least some known turbine engines are used in cogeneration facilities and power plants. Such engines may have high specific work and power per unit mass flow requirements. To increase operating efficiency, at least some known gas turbine engines may operate with increased combustion temperatures, as engine efficiency generally increases as combustion gas temperatures increase.

However, operating turbine engines at higher temperatures may also increase the generation of polluting emissions, such as oxides of nitrogen ($NO_x$). To facilitate reducing $NO_x$ emissions, at least some known gas turbine plants inject a reducing agent across a catalyst to cause $NO_x$ to be converted to elemental nitrogen. Even more specifically, the use of ammonia with a selective catalytic reduction ("SCR") catalyst is a common approach for reducing $NO_x$ emissions. However, such $NO_x$ reduction reaction is generally effective only within a given temperature range that is greater than ambient temperature.

BRIEF DESCRIPTION

In one aspect, a combined cycle power plant is provided. The power plant includes a first gas turbine engine including a first turbine section, a second gas turbine engine including a second turbine section having an aft outlet configured to discharge an exhaust gas stream, an emissions reduction system configured to receive the exhaust gas stream discharged from the second gas turbine engine, and configured to remove oxides of nitrogen from the exhaust gas stream, and an interstage extraction system communicatively coupled with the first turbine section. The interstage extraction system is configured to selectively extract turbine extraction air from the first turbine section for providing heat to the emissions reduction system.

In another aspect, a combined cycle power plant is provided. The power plant includes a first gas turbine engine including a first turbine section having an aft outlet configured to discharge a first exhaust gas stream, a first emissions reduction system configured to receive the first exhaust gas stream, and configured to remove oxides of nitrogen from the first exhaust gas stream, a second gas turbine engine including a second turbine section having an aft outlet configured to discharge a second exhaust gas stream, and a second emissions reduction system configured to receive the second exhaust stream, and configured to remove oxides of nitrogen from the second exhaust gas stream. The power plant also includes an interstage extraction system communicatively coupled with the first turbine section, with the interstage extraction system configured to selectively extract turbine extraction air from the first turbine section for providing heat to the second emissions reduction system.

In yet another aspect, a method of controlling emissions in a combined cycle power plant having a first gas turbine engine and a second gas turbine engine is provided. The method includes determining an operating temperature of an emissions reduction system for removing oxides of nitrogen from an exhaust gas stream received from the second gas turbine engine, monitoring a temperature of the emissions reduction system, and selectively extracting turbine extraction air from a turbine section of the first gas turbine engine for providing heat to the emissions reduction system. The selective extracting is based on a comparison of the monitored temperature relative to the operating temperature.

DETAILED DESCRIPTION

The embodiments described herein relate to systems and methods of heating a reduction catalyst for use in a power plant. Specifically, the systems and methods described herein use gas turbine interstage extraction gases to heat chemical injection grid and/or the selective catalytic reduction (SCR) catalysts of a heat recovery steam generator (HRSG) associated with a different gas turbine engine in the same combined cycle block. Interstage extraction is performed to facilitate reducing the startup and shutdown emissions of the gas turbine engine that are formed when the catalyst is not running at its effective operable temperature range. More specifically, turbine extraction air extracted from a first gas turbine engine is channeled to a second gas turbine engine to increase the temperature of the catalyst. The extraction is actively controlled with a controller to enable a desired HRSG exhaust flow temperature to be achieved at the AIG and catalyst associated with the second gas turbine engine. Thus, extracting turbine section gases facilitates controlling emissions from the power plant, as well as facilitates reducing load in turn down operations during periods of low power demand.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
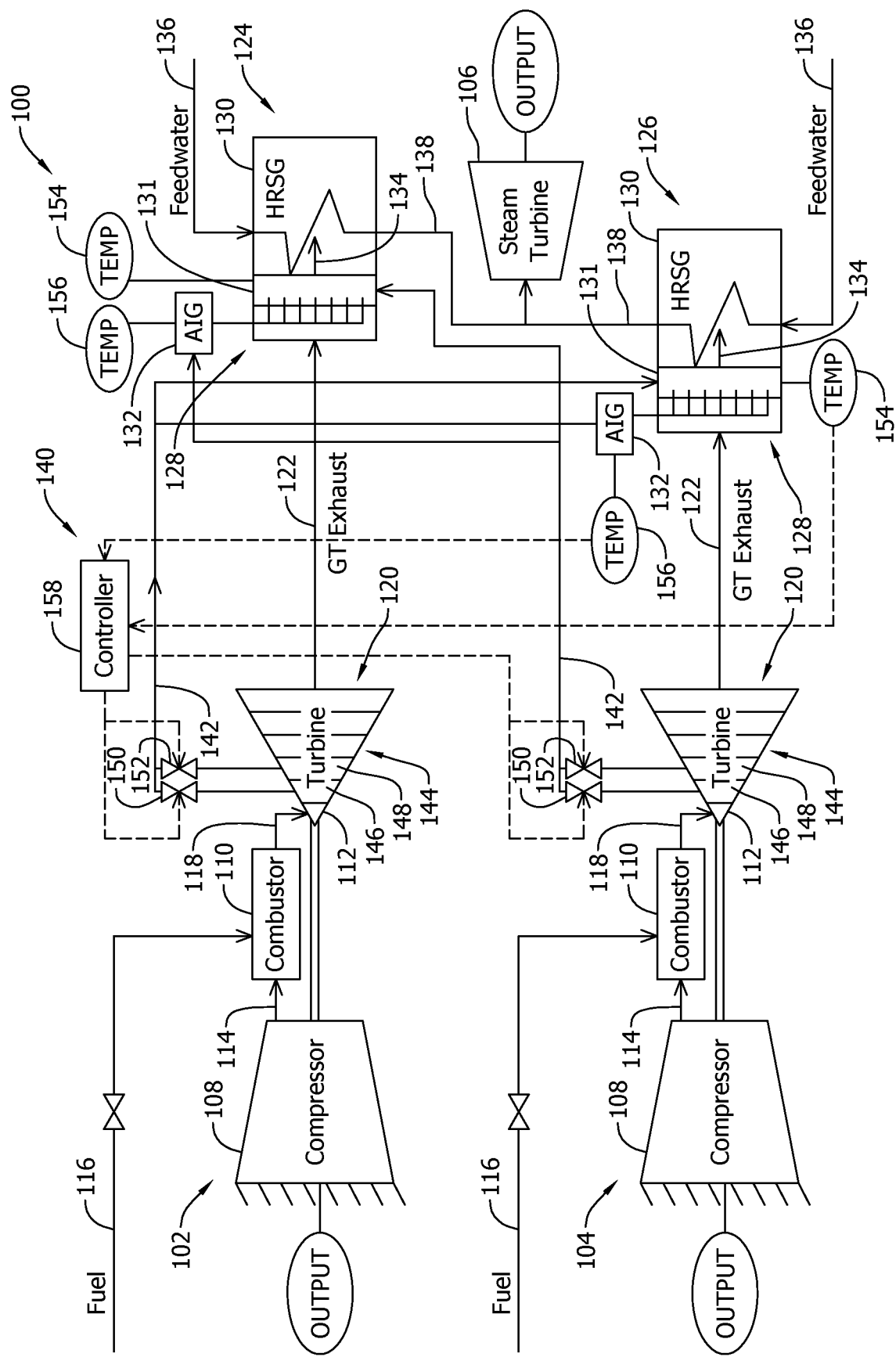
FIG. 1 is schematic illustration of an exemplary combined cycle power plant.

FIG. 1 is schematic illustration of an exemplary combined cycle power plant 100. In the exemplary embodiment, power plant 100 includes a first gas turbine engine 102, a second gas turbine engine 104, and a steam turbine 106. Each gas turbine engine 102 and 104 includes a compressor section 108, a combustor 110, and a turbine section 112 coupled together in a serial flow relationship. In operation, combustor 110 receives air 114 from compressor section 108, and fuel 116 from a fuel supply, and uses the fuel and air to create a fuel-air mixture that is combusted to generate combustion gases 118. Combustion gases 118 are channeled through turbine section 112 and discharged from an aft outlet 120 of turbine section 112 as an exhaust gas stream 122.

In the exemplary embodiment, power plant 100 also includes a first heat recovery system 124 associated with first gas turbine engine 102, and a second heat recovery system 126 associated with second gas turbine engine 104. Each heat recovery system 124 and 126 includes a emissions reduction system 128 and a heat recovery steam generator (HRSG) 130 coupled in flow communication with emissions reduction system 128. Emissions reduction system 128 includes a catalyst bed 131 and a chemical injection grid 132 in flow communication with catalyst bed 131.

During operation, exhaust gas stream 122 is received at emissions reduction system 128 to facilitate the at least partial removal of oxides of nitrogen ($NO_x$) therefrom. For example, chemical injection grid 132 injects a chemical, such as ammonia, into exhaust gas stream 122 upstream from catalyst bed 131. $NO_x$ reacts with the chemical across a surface of catalyst bed 131 in the presence of oxygen, and produces elemental nitrogen ($N_2$), water ($H_2O$), and carbon dioxide ($CO_2$). A reduced gas stream 134 is then discharged from emissions reduction system 128 for interaction with feedwater 136 in HRSG 130. Reduced gas stream 134 heats feedwater 136 to generate steam 138, which is channeled towards steam turbine 106 for generating additional power.

As described above, the $NO_x$ reduction reaction that takes place within emissions reduction system 128 may be effective only within a predetermined operating temperature range based on the catalyst material contained in catalyst bed 131. Example catalyst materials include, but are not limited to only including, base-metal oxide, platinum, and zeolite materials. In some embodiments, the temperature range may be between about 600° F. and about 1000° F. At steady state operating conditions, catalyst bed 131 may be heated to the predetermined operating temperature range via interaction with exhaust gas stream 122. At other operating conditions, such as when gas turbine engines 102 and 104 are in a transient startup or turn down mode, the temperature of exhaust gas stream 122 may be lower than at the steady state operating condition, and the temperature of catalyst bed 131 may not be within the predetermined operating temperature range.

Accordingly, in the exemplary embodiment, power plant 100 also includes an interstage extraction system 140 communicatively coupled with turbine sections 112 of gas turbine engines 102 and 104 to facilitate providing supplemental heating to emissions reduction system 128. The following description describes a scenario in which supplemental heating is provided from first gas turbine engine 102 to second heat recovery system 126 when second gas turbine engine 104 is in a transient operating mode. However, it should be understood that the following description is also applicable to a scenario in which first gas turbine engine 102 may be in a transient operating mode, and first heat recovery system 124 requires supplemental heating.

In the exemplary embodiment, interstage extraction system 140 selectively draws or extracts turbine extraction air 142 from turbine section 112 of first gas turbine engine 102 and routes it towards second emissions reduction system 128 to provide heat thereto. Turbine section 112 includes a plurality of stages 144, and turbine extraction air 142 may be drawn from any one or more of stages 144. For example, in one embodiment, stages 144 include a plurality of stages including at least a first stage 146 and a second stage 148 downstream from first stage 146. Turbine extraction air 142 extracted from first stage 146 is generally hotter than turbine extraction air 142 extracted from second stage 148. Accordingly, turbine extraction air 142 may be extracted from one or both of first stage 146 and/or second stage 148 based on a desired amount of heat and extraction air to be provided to second heat recovery system 126.

Interstage extraction system 140 includes any number of valves to be associated with the plurality of stages 144 of turbine 112. For example, system 140 includes a first valve 150 in flow communication with first stage 146, and a second valve 152 in flow communication with second stage 148, to facilitate controlling the extraction of turbine extraction air 142 from turbine section 112. In addition, a first temperature sensor 154 monitors a temperature of catalyst bed 131, and a second temperature sensor 156 monitors a temperature of a quantity of chemical in chemical injection grid 132. Valves 150 and 152, and temperature sensors 154 and 156, are communicatively coupled with a controller 158 of interstage extraction system 140. In operation, controller 158 selectively opens and closes valves 150 and 152 based on a comparison of the monitored temperatures relative to the predetermined operating temperature range.

For example, in one embodiment, controller 158 receives feedback from first temperature sensor 154 and compares the monitored temperature to the predetermined operating temperature range of the catalyst material in catalyst bed 131. In the event the monitored temperature has fallen outside the predetermined operating temperature range, controller 158 opens one or more of valves 150 and 152 to provide heat to catalyst bed 131, either directly or indirectly. In one embodiment, turbine extraction air 142 is used to heat catalyst bed 131, and is then routed for heating feedwater 136. Controller 158 may continue to monitor the temperature of catalyst bed 131 and selectively adjust the position of valves 150 and 152 to maintain the temperature of catalyst bed 131 within the predetermined operating temperature range as the load of second gas turbine engine 104 continues to be adjusted, for example.

In one embodiment, controller 158, alternatively or additionally, receives feedback from second temperature sensor 156. As described above, chemical injection grid 132 injects a chemical into exhaust gas stream 122 upstream from catalyst bed 131. The injected chemical contacts catalyst bed 131. Thus, providing heat to chemical injection grid 132 facilitates increasing the temperature of the chemical before it comes into contact with catalyst bed 131, such that turbine extraction air 142 is used to indirectly heat catalyst bed 131 to within the predetermined operating temperature range. Accordingly, in the event the monitored temperature of the catalyst material has fallen outside the predetermined operating temperature range, controller 158 opens one or more of valves 150 and 152 to provide heat to chemical injection grid 132.

In some embodiments, interstage extraction system 140 is activated when power plant 100 is in a turn down mode. When in the turn down mode, the power output of one or both of gas turbine engines 102 and 104 is reduced when power generation needs are relatively low. In one embodiment, the power output of both gas turbine engines 102 and 104 are reduced. In such a scenario, activating interstage extraction system 140 enables first gas turbine engine 102 to be turned down in a more efficient manner by making use of the energy derived from turbine extraction air 142, rather than keeping turbine extraction air 142 within first turbine section 112 to generate power that will potentially go unused.

Figure 2:
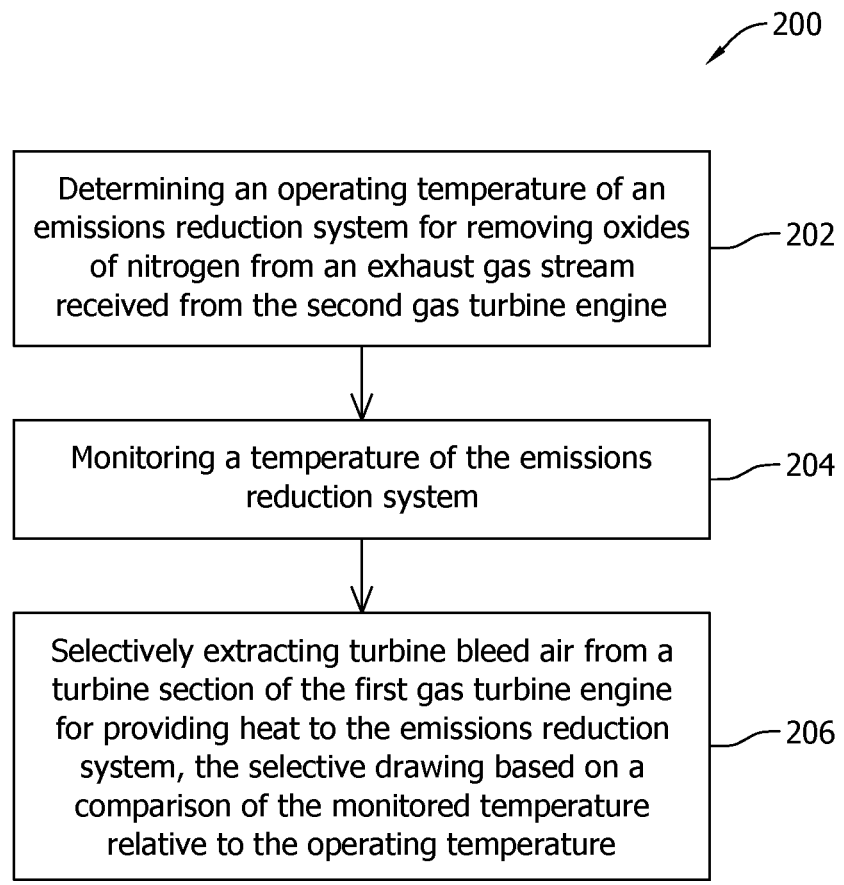
FIG. 2 is a flow diagram illustrating an exemplary method of controlling emissions in a combined cycle power plant.

FIG. 2 is a flow diagram illustrating an exemplary method 200 of controlling emissions in a combined cycle power plant. Method 200 includes determining 202 an operating temperature of an emissions reduction system for use in removing oxides of nitrogen from an exhaust gas stream received from the second gas turbine engine, monitoring 204 a temperature of the emissions reduction system, and selectively drawing 206 turbine extraction air from a turbine section of the first gas turbine engine for providing heat to the emissions reduction system, the selective drawing based on the monitored temperature relative to the operating temperature.

The embodiments described herein relate to systems and methods of using gas turbine interstage gases from a first gas turbine engine to heat the catalyst bed of a heat recovery steam generator (HRSG) associated with a different gas turbine engine coupled in the same combined cycle block. The interstage extraction is performed to reduce the startup and shutdown emissions of the different gas turbine engine that are formed when the catalyst is not operating at its effective operable temperature range. The extraction is actively controlled with a microprocessor-based controller with predetermined sequencing logarithms specifically to control the extraction of gases, and the extracted gas may be extracted from one or more different stages of a turbine section, to achieve a desired HRSG exhaust flow temperature at the location of the MG and catalyst associated with the second gas turbine engine. Thus, extracting turbine section gases facilitates controlling emissions from the power plant.

The above description is meant to be exemplary only, and one skilled in the art will recognize that changes may be made to the embodiments described without departing from the scope of the invention disclosed. For example, the process steps described herein may be modified in duration, temperature, or time between cycles, for example. Still other modifications, which fall within the scope of the present invention, will be apparent to those skilled in the art, in light of a review of this disclosure, and such modifications are intended to fall within the appended claims.

Exemplary embodiments of a combined cycle power plant are described above in detail. The methods of controlling emissions are not limited to the specific embodiments described herein, but rather, steps of the methods may be utilized independently and separately from other steps described herein. For example, the methods described herein are not limited to practice with combined cycle power plants as described herein. Rather, the exemplary embodiment can be implemented and utilized in connection with many other applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A combined cycle power plant comprising:
   a first gas turbine engine comprising a first turbine section;
   a second gas turbine engine comprising a second turbine section having an aft outlet configured to discharge an exhaust gas stream;
   an emissions reduction system configured to receive the exhaust gas stream discharged from the second gas turbine engine, and configured to remove oxides of nitrogen from the exhaust gas stream; and
   an interstage extraction system communicatively coupled with the first turbine section, the interstage extraction system configured to selectively extract turbine extraction air from the first turbine section for providing heat to the emissions reduction system.

2. The combined cycle power plant in accordance with claim 1, wherein the interstage extraction system comprises:
   at least one valve in flow communication with one of a plurality of stages of the first turbine section;
   at least one temperature sensor configured to monitor a temperature of the emissions reduction system; and
   a controller communicatively coupled with the at least one valve and the at least one temperature sensor, wherein the controller is configured to selectively open and close the at least one valve based on the monitored temperature.

3. The combined cycle power plant in accordance with claim 2, wherein the emissions reduction system comprises a catalyst bed, wherein the interstage extraction system is in flow communication with the catalyst bed for selectively heating the catalyst bed with the turbine extraction air.

4. The combined cycle power plant in accordance with claim 3, wherein the emissions reduction system further comprises a chemical injection grid in flow communication with the catalyst bed, wherein the interstage extraction system is in flow communication with the chemical injection grid for selectively heating the chemical injection grid with the turbine extraction air.

5. The combined cycle power plant in accordance with claim 2, wherein the controller is configured to selectively open and close the at least one valve to maintain the temperature with a predefined temperature range.

6. The combined cycle power plant in accordance with claim 2, wherein the at least one valve comprises a first valve in flow communication with a first stage of the plurality of stages, and a second valve in flow communication with a second stage of the plurality of stages.

7. The combined cycle power plant in accordance with claim 1, wherein the interstage extraction system is only activatable when the second gas turbine engine is in a transient operational state.

8. The combined cycle power plant in accordance with claim 1, wherein the emissions reduction system is further configured to form a reduced gas stream from the exhaust gas stream, the combined cycle power plant further comprising a heat recovery steam generator configured to receive the reduced gas stream from the emissions reduction system.

9. A combined cycle power plant comprising:
   a first gas turbine engine comprising a first turbine section having an aft outlet configured to discharge a first exhaust gas stream;
   a first emissions reduction system configured to receive the first exhaust gas stream, and configured to remove oxides of nitrogen from the first exhaust gas stream;

a second gas turbine engine comprising a second turbine section having an aft outlet configured to discharge a second exhaust gas stream;

a second emissions reduction system configured to receive the second exhaust gas stream, and configured to remove oxides of nitrogen from the second exhaust gas stream; and an interstage extraction system communicatively coupled with the first turbine section, the interstage extraction system configured to selectively extract turbine extraction air from the first turbine section for providing heat to the second emissions reduction system.

10. The combined cycle power plant in accordance with claim 9, wherein the interstage extraction system is further communicatively coupled with the second turbine section, the interstage extraction system configured to selectively extract turbine extraction air from the second turbine section for providing heat to the first emissions reduction system.

11. The combined cycle power plant in accordance with claim 9, wherein the interstage extraction system comprises:
at least one valve in flow communication with one of a plurality of stages of the first turbine section;
at least one temperature sensor configured to monitor a temperature of the second emissions reduction system; and
a controller communicatively coupled with the at least one valve and the at least one temperature sensor, wherein the controller is configured to selectively open and close the at least one valve based on the monitored temperature.

12. The combined cycle power plant in accordance with claim 11, wherein the first and second emissions reduction systems each comprise a catalyst bed and a chemical injection grid in flow communication with the catalyst bed, the at least one temperature sensor configured to monitor a temperature of the catalyst bed or of a quantity of a chemical in the chemical injection grid.

13. The combined cycle power plant in accordance with claim 11, wherein the controller is configured to selectively open and close the at least one valve to maintain the temperature with a predefined temperature range.

14. The combined cycle power plant in accordance with claim 11, wherein the at least one valve comprises a first valve in flow communication with a first stage of the plurality of stages, and a second valve in flow communication with a second stage of the plurality of stages.

15. The combined cycle power plant in accordance with claim 9, wherein the interstage extraction system is only activatable when the second gas turbine engine is in a transient operational state.

16. A method of controlling emissions in a combined cycle power plant having a first gas turbine engine and a second gas turbine engine, the method comprising:
determining an operating temperature of an emissions reduction system for removing oxides of nitrogen from an exhaust gas stream received from the second gas turbine engine;
monitoring a temperature of the emissions reduction system; and
selectively extracting turbine extraction air from a turbine section of the first gas turbine engine for providing heat to the emissions reduction system, the selective extracting based on a comparison of the monitored temperature relative to the operating temperature.

17. The method in accordance with claim 16, wherein selectively extracting the turbine extraction air comprises extracting the turbine extraction air when the monitored temperature is less than the operating temperature.

18. The method in accordance with claim 16, wherein the emissions reduction system includes a catalyst bed, the method further comprising:
monitoring a temperature of the catalyst bed; and
heating the catalyst bed with the turbine extraction air.

19. The method in accordance with claim 18, wherein the emissions reduction system further includes a chemical injection grid in flow communication with the catalyst bed, the method further comprising:
monitoring a temperature of a quantity of a chemical in the chemical injection grid; and
heating the quantity of the chemical with the turbine extraction air.

20. The method in accordance with claim 16 further comprising:
determining an operating temperature of an emissions reduction system for removing oxides of nitrogen from an exhaust gas stream received from the first gas turbine engine;
monitoring a temperature of the emissions reduction system associated with the first gas turbine engine; and
selectively extracting turbine extraction air from a turbine section of the second gas turbine engine for providing heat to the emissions reduction system associated with the first gas turbine engine, the selective extracting based on the monitored temperature relative to the operating temperature.

* * * * *

UNITED STATES PATENT AND TRADEMARK OFFICE
CERTIFICATE OF CORRECTION

| | |
|---|---|
| PATENT NO. | : 11,365,677 B2 |
| APPLICATION NO. | : 16/829731 |
| DATED | : June 21, 2022 |
| INVENTOR(S) | : Joseph Klosinski et al. |

It is certified that error appears in the above-identified patent and that said Letters Patent is hereby corrected as shown below:

In the Specification

Column 5, Line 31, delete "location of the MG" and insert therefor -- location of the AIG --.

Signed and Sealed this
Twentieth Day of June, 2023

Katherine Kelly Vidal
*Director of the United States Patent and Trademark Office*